United States Patent
Nakayoshi et al.

[11] Patent Number: 5,990,936
[45] Date of Patent: Nov. 23, 1999

[54] STEREOSCOPIC IMAGING SYSTEMS USING MEMORY AFFECT LIQUID CRYSTAL DISPLAYS

[75] Inventors: Hirokazu Nakayoshi, Kanagawa; Yoshiki Shirochi, Chiba; Seizi Sato, Kanagawa; Hiroyuki Shiota, Chiba; Hiroshi Mamiya; Naoki Kamaya, both of Tokyo, all of Japan

[73] Assignee: Sony Corporation, Japan

[21] Appl. No.: 08/205,394

[22] Filed: Mar. 3, 1994

Related U.S. Application Data

[63] Continuation of application No. 07/951,854, Sep. 28, 1992, Pat. No. 5,357,277.

[30] Foreign Application Priority Data

Apr. 10, 1992 [JP] Japan .................................... 4-256836

[51] Int. Cl.$^6$ ............................. H04N 7/18; H04N 13/04
[52] U.S. Cl. ........................................................... 348/56
[58] Field of Search ............................. 348/57, 56, 55, 348/54, 53, 52, 51, 43, 42

[56] References Cited

U.S. PATENT DOCUMENTS

| | | | |
|---|---|---|---|
| 3,818,125 | 6/1974 | Butterfield | 358/91 |
| 4,233,603 | 11/1980 | Castleberry | 359/58 |
| 4,542,960 | 9/1985 | Yang | 359/55 |
| 4,559,555 | 12/1985 | Schoolman | 358/88 |
| 4,706,117 | 11/1987 | Schoolman | 358/88 |
| 4,743,964 | 5/1988 | Allard et al. | 358/88 |
| 4,933,755 | 6/1990 | Dahl et al. | 358/88 |
| 4,952,024 | 8/1990 | Gale | 358/88 |
| 4,954,890 | 9/1990 | Park | 358/88 |
| 4,967,267 | 10/1990 | Gallaher, Jr. | 358/88 |
| 4,982,278 | 1/1991 | Dahl et al. | 358/88 |
| 5,001,555 | 3/1991 | Park | 358/88 |
| 5,032,912 | 7/1991 | Sakariassen | 358/88 |

FOREIGN PATENT DOCUMENTS

| | | | |
|---|---|---|---|
| 60-223281 | 11/1985 | Japan | 358/88 |
| 2113058 | 7/1983 | United Kingdom | 358/88 |

*Primary Examiner*—Bryan Tung
*Attorney, Agent, or Firm*—Ronald P. Kananen; Rader, Fishman & Grauer

[57] ABSTRACT

An imaging system includes left and right display panels arranged so as to be viewed separately by left and right eyes of a viewer. A three dimensional video signal is supplied to a drive circuit for the display panels such that image data from the three dimensional video signal is supplied alternately to the left and right display panels. The display panels are of a memory effect LCD type such that, when no image data is received by the display panel, the image data of the previously received field is maintained on display for providing flickerless imaging.

14 Claims, 8 Drawing Sheets

FIG.7
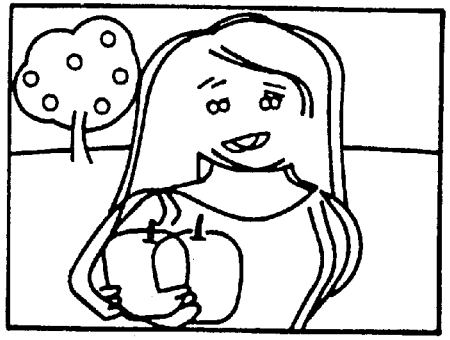
FIG.8(a)     FIG.8(b)
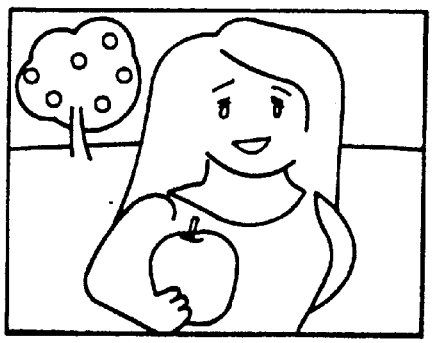 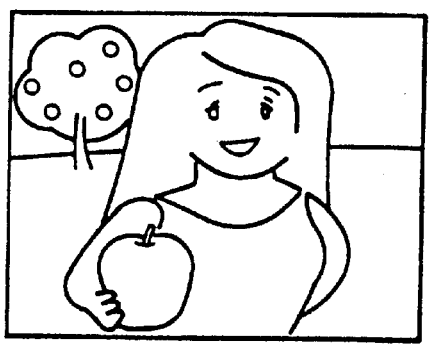
FIG.9
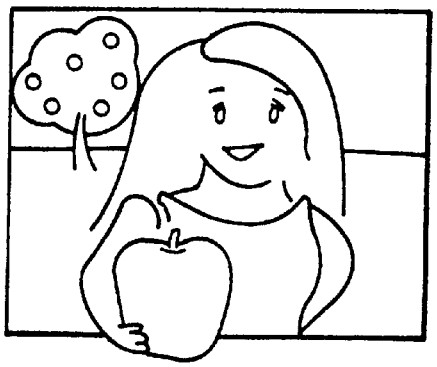

STEREOSCOPIC IMAGING SYSTEMS USING MEMORY AFFECT LIQUID CRYSTAL DISPLAYS

This application is a continuation of application Ser. No. 07/951,854 filed Sep. 28, 1992.

BACKGROUND OF THE INVENTION

1. Field of the Invention

The present invention relates generally to an imaging system. Particularly, the present invention relates to a stereoscopic imaging system in which three dimensional video signals, or the like may be displayed.

2. Description of the Prior Art

In the past, various apparatus have been introduced for providing stereoscopic images for enjoyment. Most of these devices were quite cumbersome and usually displayed stereoscopic still images. Some stereoscopic moving image systems have been proposed however. For example, FIG. 10 shows a stereoscopic viewer developed in the 1970's. This system comprised a television receiver 101, which received a signal with left and right image data supplied at alternating fields. The images are viewed through a shutter apparatus 102 equipped with a motor 103 which must time the shutter speed to the rate of field alternation on the television screen via a display driver 104. Via this system three dimensional (3-D) images could be obtained. However, the apparatus is large and clumsy and flicker occurred which obscured total enjoyment of the 3-D effect.

Later, so called VHD type video disks were introduced in a 3-D format. According to this system, 3-D images could be viewed via special shutter glasses worn by a viewer allowing respective images to be seen by each eye, providing a so-called 'virtual reality' effect.

Further, on Dec. 5, 1949 a physics paper by Sakae Matsuda was published by Ikeda Shoten (pg. 235) which discussed stereoscopes and stereoscopic imaging.

According to this paper, a person's left eye sees a left hand portion of an object and a right eye sees a right hand portion thereof, combining these two partial views yields a complete image in three dimensional fashion.

Referring to FIG. 11, a representation is shown of a stereoscope utilizing convex lenses for viewing from two sources, as in a person normally seeing an object in binocular fashion. As can be appreciated, each eye sees an image with a left and right component (L,R/L', R') which is resolved as one three dimensional image (L" R").

In the above type of stereoscope, since one eye sees only half of the total fields displayed at a video field speed of 1/60 sec., each eye will see images at a rate of 1/30 sec. At such a rate, considerable flicker is present which degrades appreciation of 3-D viewing.

SUMMARY OF THE INVENTION

It is therefore a principal object of the present invention to overcome the drawbacks of the prior art.

It is a further object of the present invention to provide an imaging system by which three dimensional video images as well as conventional video images may be displayed.

It is also an object of the present invention to provide so-called 'flickerless' display of three dimensional and/or conventional video images.

In order to accomplish the aforementioned and other objects, an imaging system is provided, comprising: display means including first and second display elements of an image retaining type so adapted as to be viewed by left and right eyes of a viewer, respectively; a drive circuit for the first and second display means for alternately supplying image data to the first and second display elements at every field of an input image signal such that, when one field is being supplied to one of the display elements, the image data of the field previously supplied to the other of the display elements is maintained by the other of the display elements.

BRIEF DESCRIPTION OF THE DRAWINGS

In the drawings:

FIG. 7 is another explanatory illustration of the operation of the embodiment;

FIGS. 8A and 8B are third and fourth explanatory illustrations of the stereoscopic aspects of the operation of the embodiment;

FIG. 9 is an fifth explanatory illustration of the stereoscopic aspects of the operation of the embodiment;

DESCRIPTION OF THE PREFERRED EMBODIMENT

Figure 1:
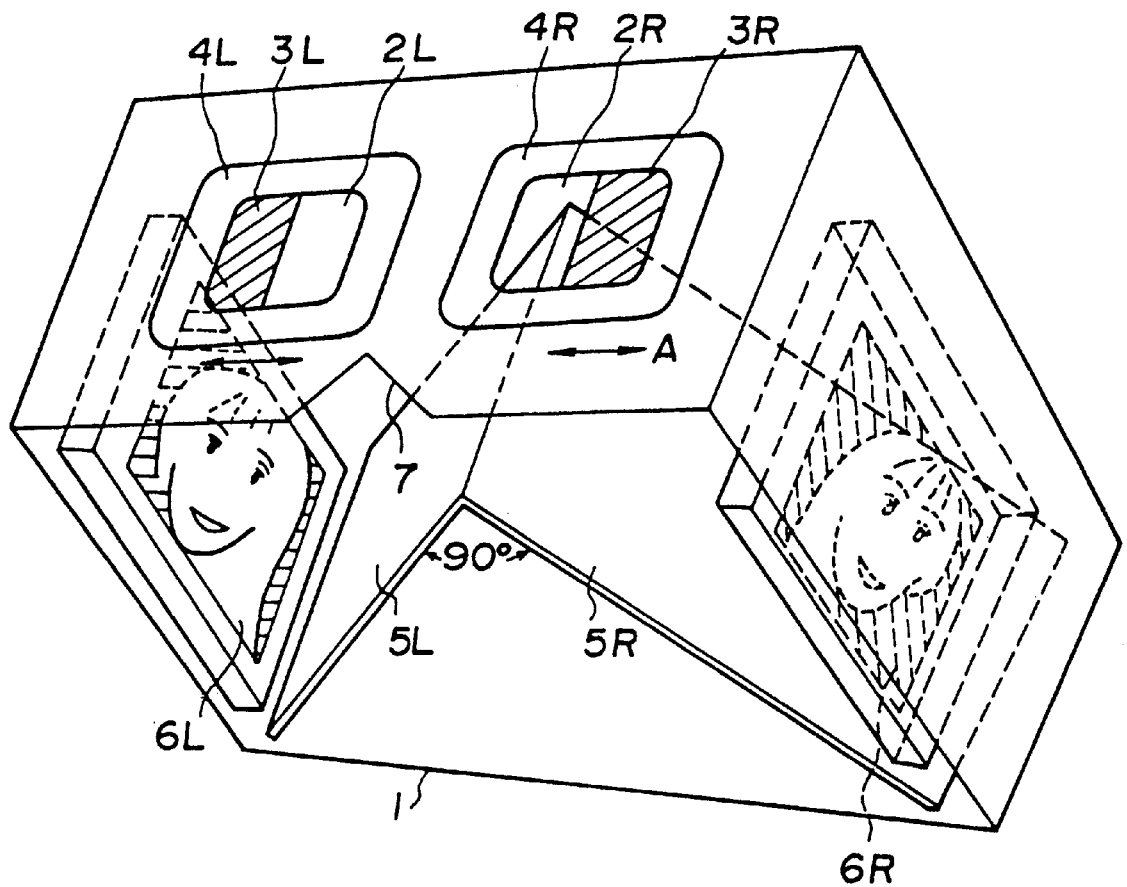
FIG. 1 is a perspective view of a first embodiment of the invention.

Referring now to the drawings, particularly to FIG. 1, a first embodiment of an apparatus for an imaging system according to the invention is shown. Excluding a circuit portion thereof, which will be explained hereinlater, the apparatus comprises a casing 1, viewfinder lenses 2L and 2R, lens covers 3L, 3R, lens frames 4L, 4R, mirrors 5L, 5R, memory type liquid crystal display panels (LCDs) 6L, 6R, and a cutout portion 7 for accommodating the nose of a viewer. It will be noted that L and R, as used in the specification, refer to left and right respectively.

As a viewer looks into the apparatus of FIG. 1, opposed left and right eyes look through left and right viewfinder lenses 2L and 2R, respectively. The lens covers 3L and 3R cover half of their respective lenses 2L, 2R at an outer side thereof. The viewfinder lenses 2L, 2R and the lens frames 4L, 4R therefor, are respectively movable in the direction of the arrows A of FIG. 1 for adjusting the lens position to the eye position of a viewer. Two mirrors, 5L, 5R are mounted in front of the viewfinder lenses at an angle of 90° relative each other, such that an apex of the angle at which they meet faces a point substantially between the viewfinder lenses 2L, 2R and the axis along which the mirrors 5L, 5R meet is perpendicular to the arrow A of FIG. 1. Liquid crystal display elements (LCDs) 6L, 6R are mounted at left and right sides of the apparatus, facing the mirrors 5L, 5R, and in the reflective fields thereof.

Figure 2:
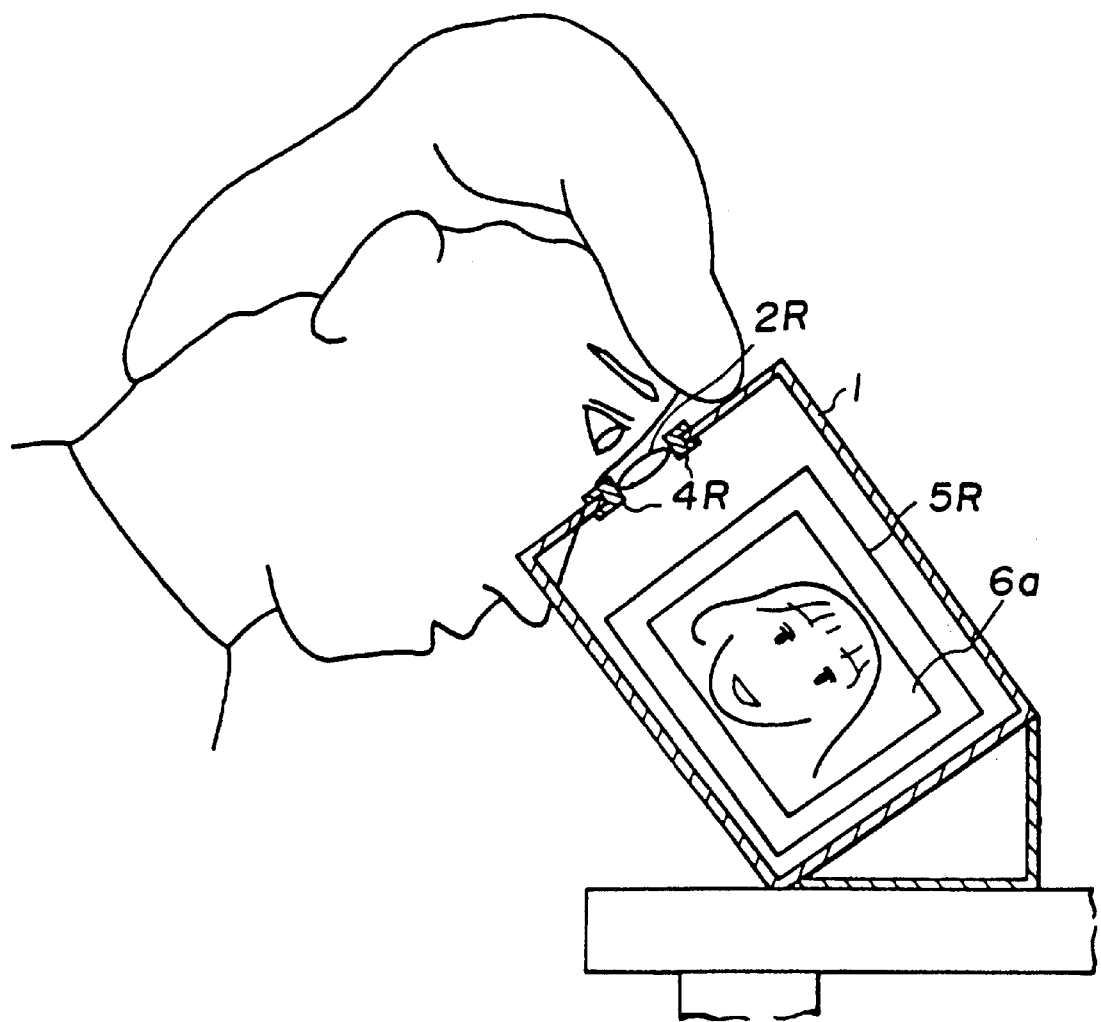
FIG. 2 is an explanatory view showing the method of using the embodiment of FIG. 1.

FIG. 2 shows a cross-sectional view of the apparatus as described above while in use for viewing images by a viewer (i.e. a person). As seen in the drawing, the cabinet 1 is positioned at an angle to facilitate easy viewing. An image 6a of the right LCD 6R is reflected from the mirror 5R to the lens 2R to be viewed by the right eye of a viewer (not shown). Further, the lens frame 4R (4L) may be moved in right or left directions for adjusting to suit the eyes of a viewer.

Figure 3:
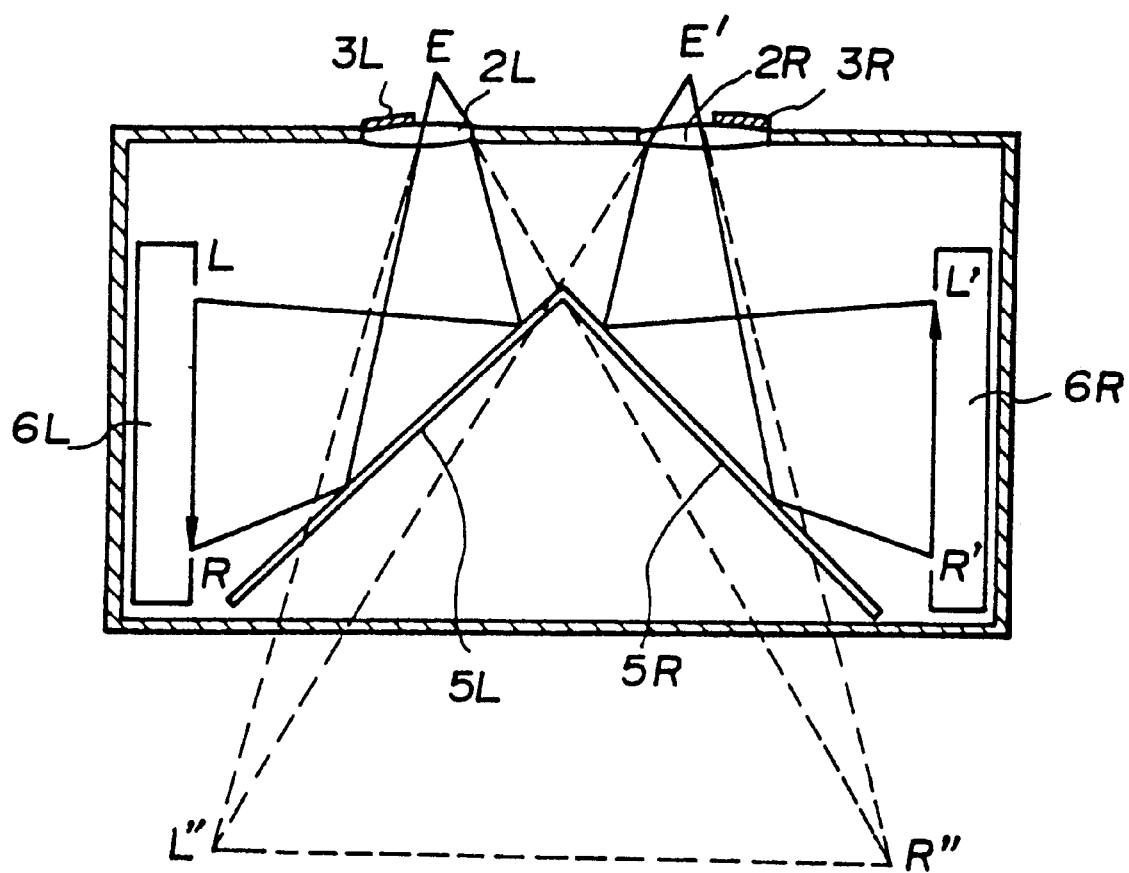
FIG. 3 is an explanatory diagram illustrating the optical characteristics of the first embodiment.

FIG. 3 shows the optical characteristics of the apparatus of the invention. As seen in the drawing, right and left LCDs 6R, 6L display right and left sides of their respective images R', L' (R, L) to be reflected by the mirrors 5R, 5L to respective lenses 2R, 2L where the images are magnified. From a point of sight E, E' of a viewer a three-dimensional image R", L" may be seen. Of course, the LCDs 6R, 6L may be supplied identical, that is to say, non-three-dimensional, images for display through the viewfinder lenses 2R, 2L as well. Further, sound may be provided via headphones, speakers or the like (not shown) to enhance enjoyment of the images.

Figure 4:
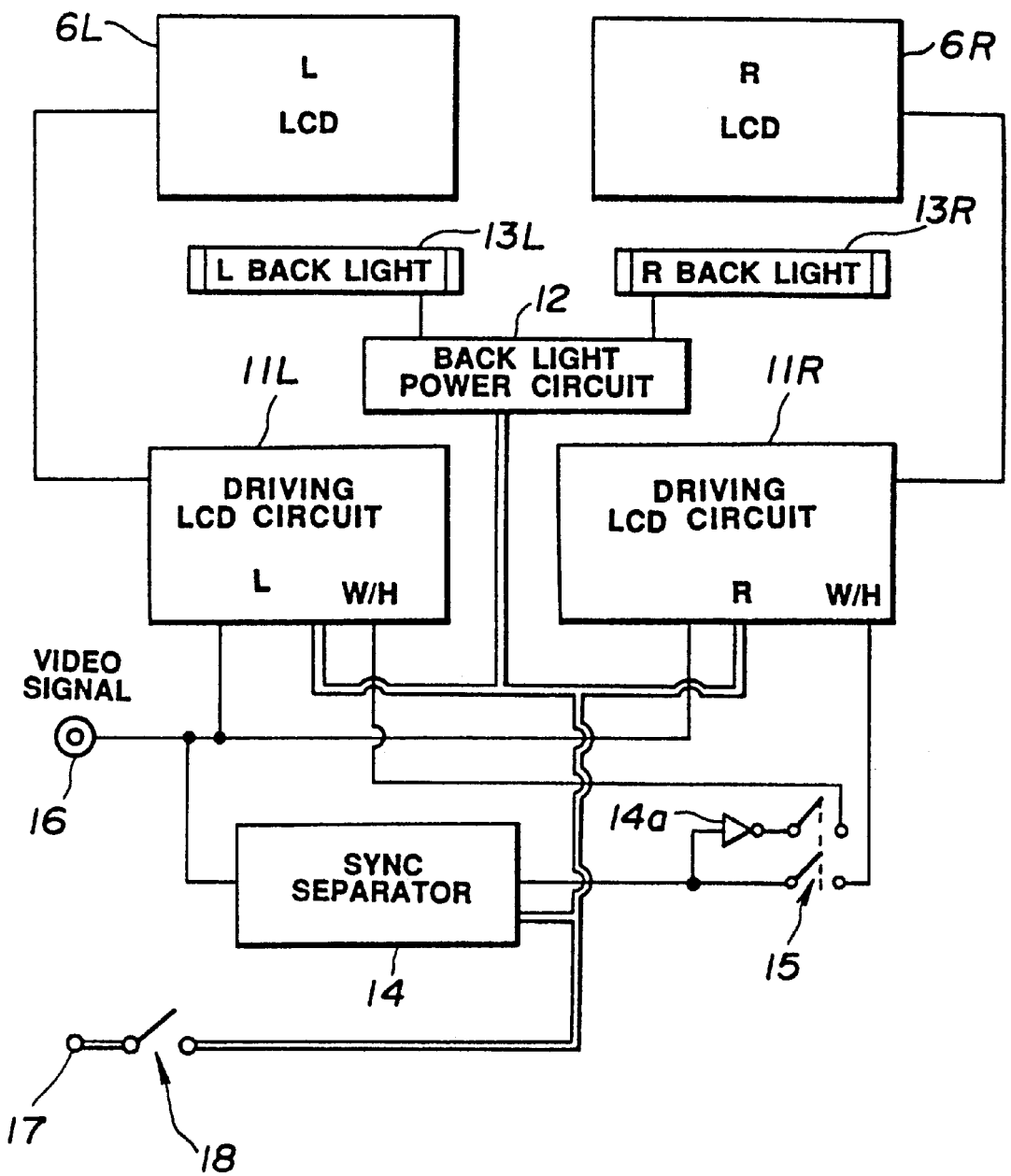
FIG. 4 is a block diagram of the circuit arrangement utilized in the first embodiment.

Next, a circuit portion of the imaging apparatus of the first embodiment will be described hereinbelow with reference to FIG. 4. As seen in the drawing, display driving circuits 11R, 11L are connected to the LCDs 6R, 6L. Further, a backlight power source 12 provides power to backlights 13R, 13L for backlighting the LCDs 6R, 6L for enhancing the visibility of displayed images. The circuit also comprises a sync separator 14, an inverter 14a for inverting a signal from the sync separator 14, a three dimensional signal switch 15, a video signal input terminal 16, a power source terminal 17 and a power source switch 18.

Hereinbelow, the functioning of the circuit portion, as described above, will be described in detail.

According to this embodiment, the above mentioned memory effect type LCD is utilized to realize a flickerless 3-D (three dimensional) image. This type of memory effect LCD is used in so-called 'video walkman' type devices to achieve noiseless still images in a 2 head playback system.

Basically, a memory effect type LCD is subject to an electrical field in which a polarization direction varies. The LCD receives a charge in a capacitance area between two electrodes, and after a charge is received the device becomes OFF. In this state, a stored charge is maintained until discharge occurs. When leakage occurs, or a subsequent drive signal is received, the held charge (image) fades away. Leakage in such a device is dependent-upon the materials from which the device is formed and the efficiency of the LCD is influenced accordingly. According to the above, when a charge is applied to the LCD, flaws such as overheating, smear, and/or flicker may occur, shortening the longevity of a stored image.

The display driving circuits 11R, 11L utilize a W/H (write/hold) terminal for image refresh operation. According to this, a W mode is adopted for writing a new image signal into the memory effect LCD 6R or 6L and an H mode is adopted for maintaining an image received in a previous field. Switching between W and H modes is controlled by the display driving circuits 11R, 11L.

Further, according to the circuit arrangement of the present embodiment, the power source terminal 17 supplies power to the driving circuits 11R, 11L, the backlight power source 12, the sync separator 14, etc., via the power switch 18.

The sync separator 14 synchronously receives vertical video signals and produces a switching signal therefor. On the other hand, a 2 range 3-D signal switch 15, between the sync separator 14 and the W/H terminal of the display driving circuit 11R, and an inverter 14a, for inverting a signal between the sync separator 14 and the 3-D playback switch 15, are connected with the W/H terminal of the display driving circuit 11L.

Figure 5:
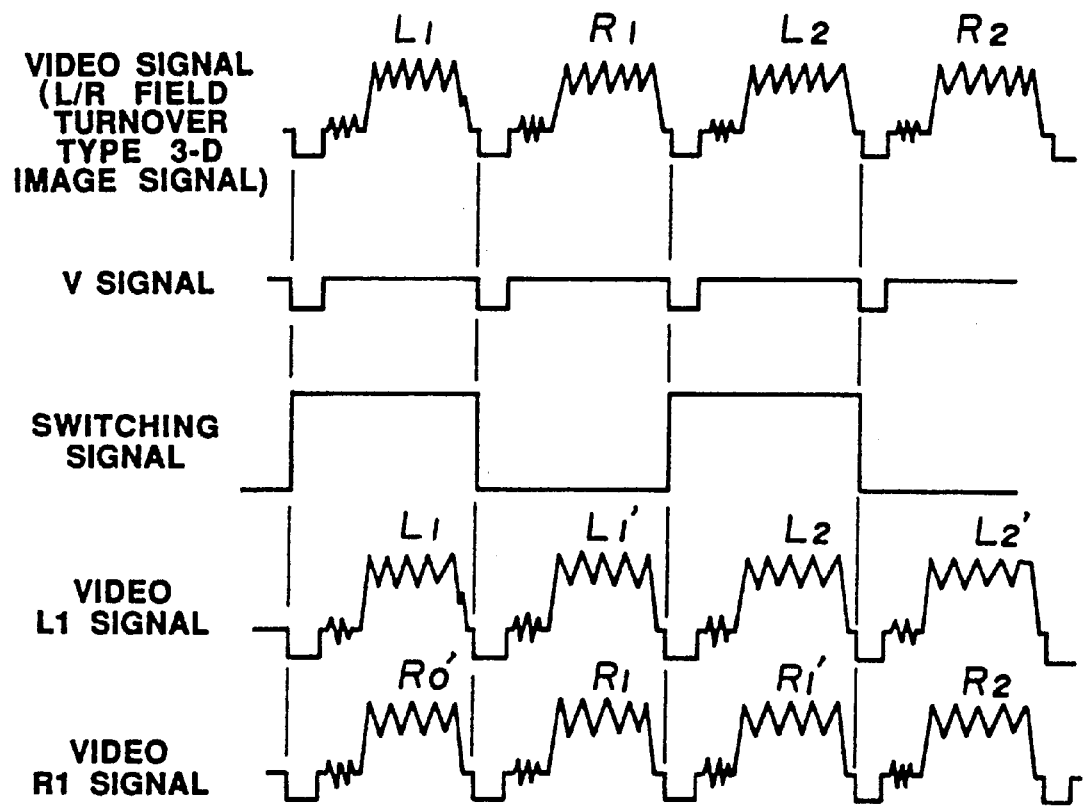
FIG. 5 is a signal timing chart of the operation of the embodiment.

FIG. 5 shows a signal timing chart for an imaging system according to the invention. As seen in the drawing, when the 3-D playback switch 15 is OFF, which occurs when the switch 15 is open, left and right image data is supplied to the LCDs 6R, 6L in unmodified form. On the other hand, when the 3-D playback switch 15 is ON, which occurs when switch 15 is closed, for each field of logical "1", a synchronous vertical signal V and a switched state of a switching signal causes image data to be input to one of the display drive circuits 11R, 11L according to the state of the switching signal. At each frame, the signal is inverted before being applied to the display drive circuit 11L so as to alternately supply a left video frame to the display drive circuit 11L followed by a right video frame to the display drive circuit 11R (L1, R1, L2, R2, L3 . . . ). As discussed above, since memory type LCDs are utilized and the display drive circuits 11R, 11L are provided with W/H terminals, image data supplied to one LCD in a write (W) operation is maintained in a hold mode (H) while writing to the other LCD is performed, and vice versa. Thus flickerless 3-D images may be achieved. As for the video signal and switching signal relationship, a frame of the video signal is alternately supplied to each of the display drive circuits 11L, 11R. For example, a frame L1 is written to the LCD 6L via the display drive circuit 11L and then the switching signal causes the video signal to be written to the LCD 6R via the display drive circuit 11R. While the video signal is being supplied to the right LCD 6R, the frame in the left LCD is held at L1' so the frames are written to alternate LCDs in the following manner; R0', L1, R1, L1', R1', L2, . . . and a flickerless video display is obtained. In addition, according to the above, when a 3-D signal is switched in left/right order (L1, R1, L2, R2 . . . ), the LCDs 6R, 6L may be appropriately provided with the correct right and left video signals for providing optimal imaging.

Figure 6:
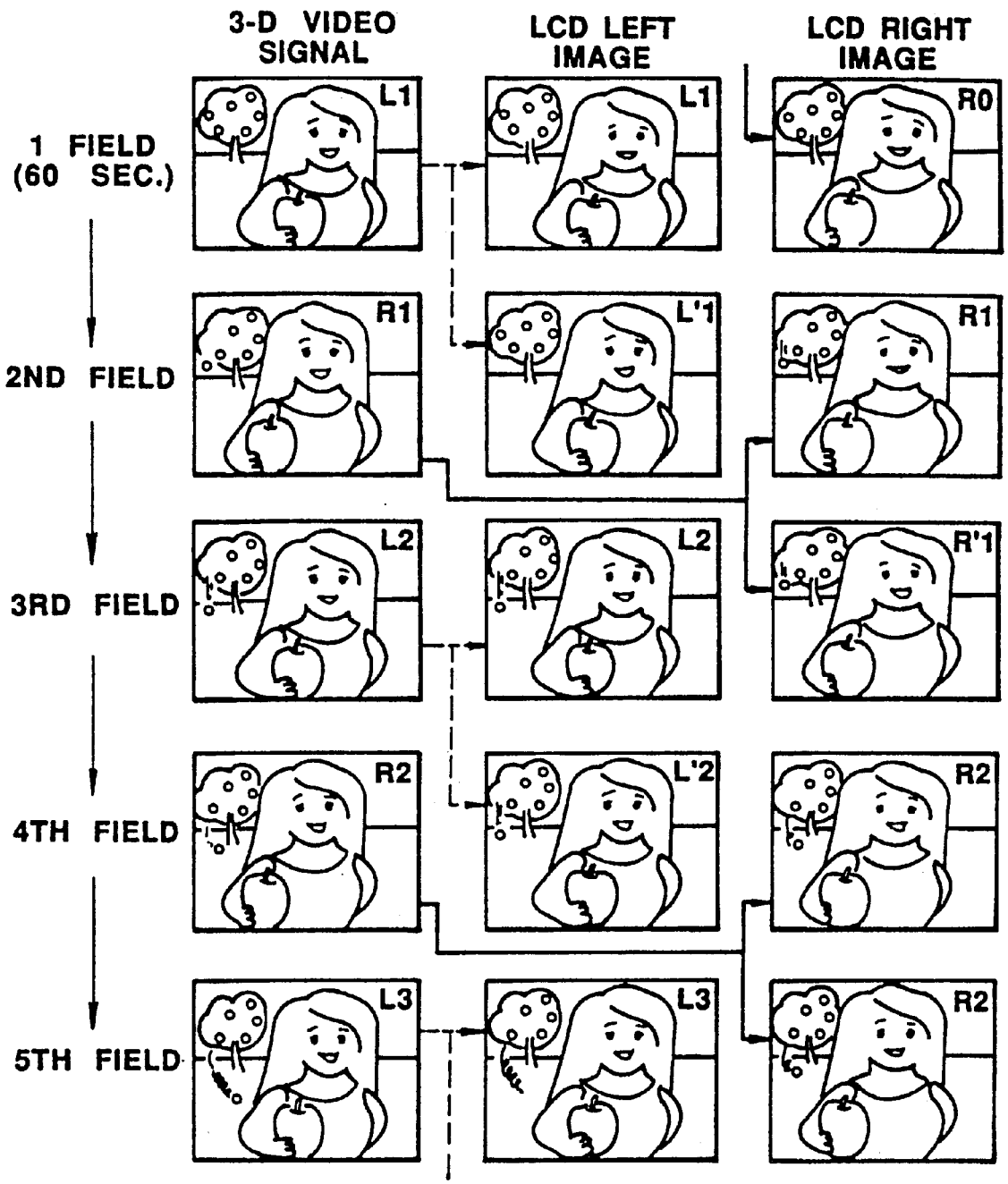
FIG. 6 is an explanatory illustration of the stereoscopic aspects of the operation of the embodiment.
Figure 10:
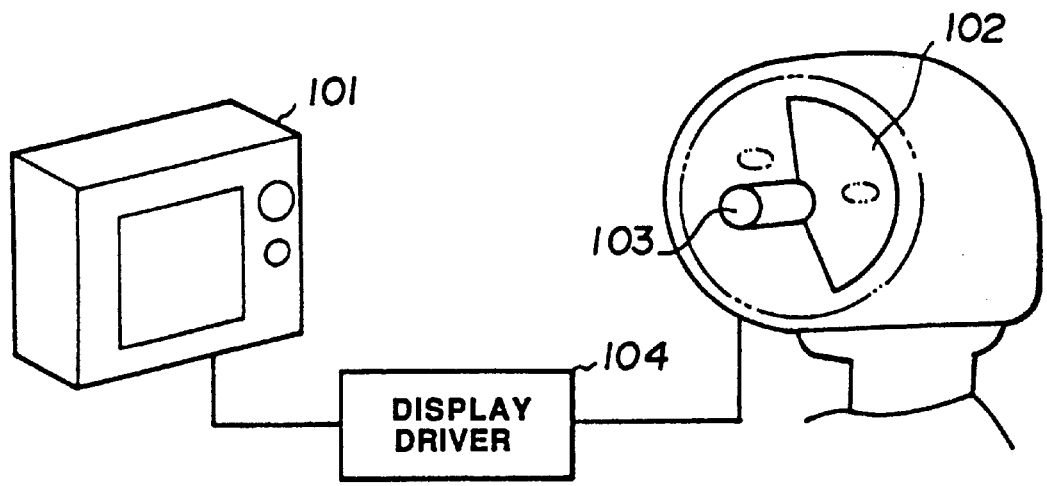
FIG. 10 is a schematic illustration of a conventional stereoscopic imaging system.
Figure 11:
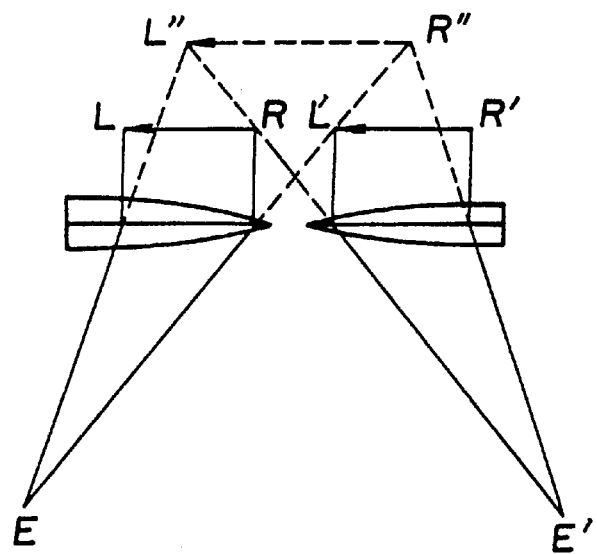
FIG. 11 is an explanatory diagram of visual principles in connection with the invention.

FIG. 6 shows a simplified diagram for elaborating the above. In the drawing, the left-hand column represents transmission of a 3-D image signal. Each image in the left-hand vertical row represents 1 of the 3-D signal comprised of alternate left and right image data (L1, R1, L2, R2, L3 etc.). As an example, an image of a girl holding an apple is represented. As may be appreciated, the apple is in the foreground of the picture while the girl occupies a middle ground and in the background an apple tree can be seen. In 3-D imaging, a parallax effect on the foreground image (the apple) will be large while a middle ground image the girl, will be small. For the background image the tree, no parallax effect will be observed. As can be observed, as time progresses, one apple falls from the tree. The progress of the apple's fall can be seen in subsequent frames of the 3-D signal. The first field L1 is displayed on the left LCD 6L, while the second field R1 is displayed on the right LCD 6R. It will be noted that, while the second field R1 is being supplied to the right LCD 6R, no signal is supplied to the left LCD 6L. During this interval, a hold mode is adopted by the LCD 6L and a held image L'1 is displayed. This pattern continues in sequence as shown in FIG. 6.

In general, a 3-D signal may be a video signal, and may be received and displayed by a television receiver, or the like. FIG. 8 shows respective left and right images, while FIG. 7 shows these images overlapped, as if they were displayed on a single screen. However, since these left and right images are seen separately by left and right eyes of a viewer, they resolve into a single image as shown in FIG. 9, wherein the girl seems to 'float', that is, to be dimensionally distanced, from the background, and the apple to be spatially in front of the girl. Thus a 3-D effect is obtained.

Further, according to the above described embodiment, wherein separate left and right display means is provided for each eye of a viewer, a so-called 'eyeglass type viewer' and/or a 'headphone type viewer' may be constructed. In addition, according to the provision of the 3-D signal switch 15, an 8 mm video tape 'utility space' and/or a half-inch video tape control CTL signal, for example, may be utilized in manufacturing 3-D video software so as to allow a 3-D signal to be detected for activating the 3-D signal switch automatically.

Also, according to the present invention, wherein memory effect type LCDs are utilized, flickerless display may be obtained and, even when ordinary video images are supplied to the apparatus, a viewer's viewing experience may be intensified. Also, image data from the display drive circuits 11R, 11L of the invention may alternatively be supplied to external display means. Audio apparatus such as stereo headphones etc., may be easily integrated with the 3-D imaging system of the invention as well, thus allowing the system of the invention to be realized in various constructions for various applications.

While the present invention has been disclosed in terms of the preferred embodiment, in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An imaging system comprising:
   a casing;
   a first viewfinder lens and a second viewfinder lens provided on said casing, each said viewfinder lenses having an optical axis extending into said casing;
   a first display element providing a first image and a second display element proving a second image, said first and second display elements being mounted within said casing at opposite ends thereof and projecting said first and second images toward each other;
   first and second mirrors respectively arranged along the respective optical axes of said first and second viewfinder lenses and in front of said first and second display elements at an angle of 90° relative to each other whereby said first and second images from said first and second display elements respectively reflect off said first and second mirrors to said first and second viewfinder lenses;
   a drive circuit for said first and second display elements for alternately supplying image data to said first and second display elements at every field of an input image signal such that, when one field is being supplied to one of said first and second display elements, the image data of the field previously supplied to the other of said first and second display elements is maintained by said other of said first and second display elements;
   wherein said input image signal can comprise either a three dimensional video signal or a conventional video signal and wherein said images from said first and second display elements are supplied directly to said first and second mirrors, respectively; and
   wherein said first and second display elements comprise liquid crystal display panels.

2. An imaging system as set forth in claim 1, wherein said input image signal comprises a three dimensional video signal.

3. An imaging system as set forth in claim 1, further comprising switching means for detecting a type of input signal and for supplying respective video images to each of said first and second display elements alternately at a first switching position and to supply alternating left and right image data to the corresponding one of said first and second display elements at a second switching position.

4. An imaging system as set forth in claim 3, wherein a control signal comprising a component of a received video signal is utilized for automatically activating said switching means.

5. An imaging system as set forth in claim 1, wherein said first and second display elements comprise memory effect type liquid crystal display panels.

6. An imaging system as set forth in claim 1, wherein said casing comprises a cutout portion for accommodating the nose of a viewer.

7. An imaging system as set forth in claim 1, wherein said left and right viewfinder lenses are provided with lens covers covering a portion of the focal area of said right and left viewfinder lenses at an outer side thereof.

8. An imaging system as set forth in claim 1, wherein said left and right viewfinder lenses are mounted in respective lens frames which are movable toward and away from each other.

9. An imaging system as set forth in claim 1, wherein said casing comprises an angled bottom so as to sit in a tilted position.

10. An imaging system as set forth in claim 1, further comprising a backlight power source for providing power to lighting elements backlight said first and second display elements.

11. An imaging system as set forth in claim 1, wherein said imaging system further comprises a sync separator and an inverter for inverting a signal from said sync separator.

12. An imaging system as set forth in claim 1, further comprising display driving circuits respectively for said first and second display elements utilizing a write/hold terminal for image refresh operation such that a write mode is adopted for writing new image data to one of said first and second display elements and a hold mode is adopted for maintaining previous image data at said one of said first and second display elements when said new image data is not being written thereto, said display driving circuits controlling switching between said write mode and said hold mode.

13. An imaging system as set forth in claim 1 wherein said liquid crystal display panels are memory effect type liquid crystal display panels.

14. An imaging system as set forth in claim 1 wherein said first and second display elements further comprise backlights which illuminate said first and second liquid crystal display panels.

* * * * *

UNITED STATES PATENT AND TRADEMARK OFFICE
CERTIFICATE OF CORRECTION

PATENT NO. : 5,990,936
DATED : November 23, 1999
INVENTOR(S) : NAKAYOSHI et al.

It is certified that error appears in the above-identified patent and that said Letters Patent is hereby corrected as shown below:

Column 5, Line 44, Claim 1, Line 7, "proving" should read - - providing- -.
Column 6, line 41, Claim 10, line 3, "elements backlight" should read - -elements which backlight- -.

Signed and Sealed this

Fifteenth Day of August, 2000

Q. TODD DICKINSON

Attest:

Attesting Officer

Director of Patents and Trademarks